United States Patent [19]
Fujita

[11] Patent Number: 6,035,363
[45] Date of Patent: *Mar. 7, 2000

[54] INFORMATION INPUT ADAPTER AND AN INFORMATION PROCESSING SYSTEM

[75] Inventor: Shigeru Fujita, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/597,875

[22] Filed: Feb. 7, 1996

[30] Foreign Application Priority Data

Feb. 8, 1995 [JP] Japan .................................... 7-019636

[51] Int. Cl.⁷ ...................................................... G06F 13/00
[52] U.S. Cl. .............................................. 710/129; 710/62
[58] Field of Search ..................... 395/309, 500, 395/831, 882, 884, 885, 887, 892, 893; 710/129, 11, 62, 64, 65, 67, 72, 73

[56] References Cited

U.S. PATENT DOCUMENTS

| | | | |
|---|---|---|---|
| 4,868,780 | 9/1989 | Stern | 395/892 |
| 5,146,584 | 9/1992 | Christensen | 395/893 |
| 5,191,653 | 3/1993 | Banks et al. | 395/293 |
| 5,305,449 | 4/1994 | Ulenas | 395/500 |
| 5,309,566 | 5/1994 | Larson | 395/890 |
| 5,490,283 | 2/1996 | Chin | 395/893 |
| 5,574,859 | 11/1996 | Yeh | 395/200.01 |
| 5,630,170 | 5/1997 | Koizumi et al. | 395/834 |
| 5,634,079 | 5/1997 | Buxton | 395/892 |
| 5,680,536 | 10/1997 | Tyuluman | 395/180 |

*Primary Examiner*—Glenn A. Auve
*Attorney, Agent, or Firm*—Fitzpatrick, Cella, Harper & Scinto

[57] ABSTRACT

In an information processing system, an input device is connected to different information processing apparatuses through plural interfaces. Any one of the information processing apparatuses connected by the plural interfaces is selected and information inputted by the input device is converted into information that can be processed by the selected information processing apparatus.

6 Claims, 7 Drawing Sheets

INFORMATION INPUT ADAPTER AND AN INFORMATION PROCESSING SYSTEM

BACKGROUND OF THE INVENTION

1. Field of the Invention

The present invention relates to an information input adapter that alters information that is entered with an input device, and to an information processing system that has such an information input adapter.

2. Related Background Art

Conventionally, each information processor, such as a personal computer or a word processor, must have at least one input device, such as a keyboard, a mouse, or a tablet.

In most cases, interfaces for employment between information processors and input devices are not compatible with all information processors, depending on models (or makers) of the information processors. For example, of the well known mice for personal computers, some are connected by using a serial port, while others are connected by using special buses, such as a bus that is intended for use only to connect a mouse or only to connect a mouse and a keyboard. The interfaces between the information processors and the input devices are not standardized.

The structures of the input devices, such as keyboards, mice, or tablets, do not vary greatly, even though the models may be different. However, the interfaces employed between information processors and input devices, i.e., the kinds of interface signals and the arrangements for connector pins, vary, depending on the models, and in many cases, input devices for specific information processor models can not be connected to other processors.

The following shortcomings have arisen due to the lack of compatibility of the interfaces between input devices and information processors.

If a new, additional information processor that is to be purchased is a different model than the processor for an input device that a user currently owns, another input device must be purchased. In other words, since a plurality of input devices that have the same function and almost the same structure are used, the device resource utilization efficiency is low, and the amount of money that is spent is large.

Further, since each information processor requires at least one input device, a user who employs a plurality of information processors must also have on his or her desk a plurality of input devices, such as keyboards, mice, or tablets, that have the same function, i.e., the data input function. As a result, there will be very little free space available on the user's desk. This will make it quite inconvenient for the user to perform his or her work, since a large amount of space is required to comfortably use the equipment.

If one input device is compatible with a plurality of different information processor models, and all the processors can share this one input device by a cable being switched, a large amount of space may be made available on a user's desk. However, when these information processors are alternately employed, the cable switching that is required becomes troublesome, and such an employment method is not suitable for practical use.

The object of the present invention is, therefore, the resolution of the above described shortcomings, and the enhancement of the compatibility between information processors and input devices, so that information processors and input devices that have different interfaces can be used together.

SUMMARY OF THE INVENTION

According to the embodiments of the present invention, provided is an information input adapter that can enable the transmission of data entries to an information processor from an input device that has a different interface system.

Other objects and features of the present invention will become obvious during the course of the following explanation that is given while referring to the accompanying drawings.

DETAILED DESCRIPTION OF THE PREFERRED EMBODIMENTS

The present invention will now be described in detail by referring to the following preferred embodiments and the accompanying drawings.

Figure 1:
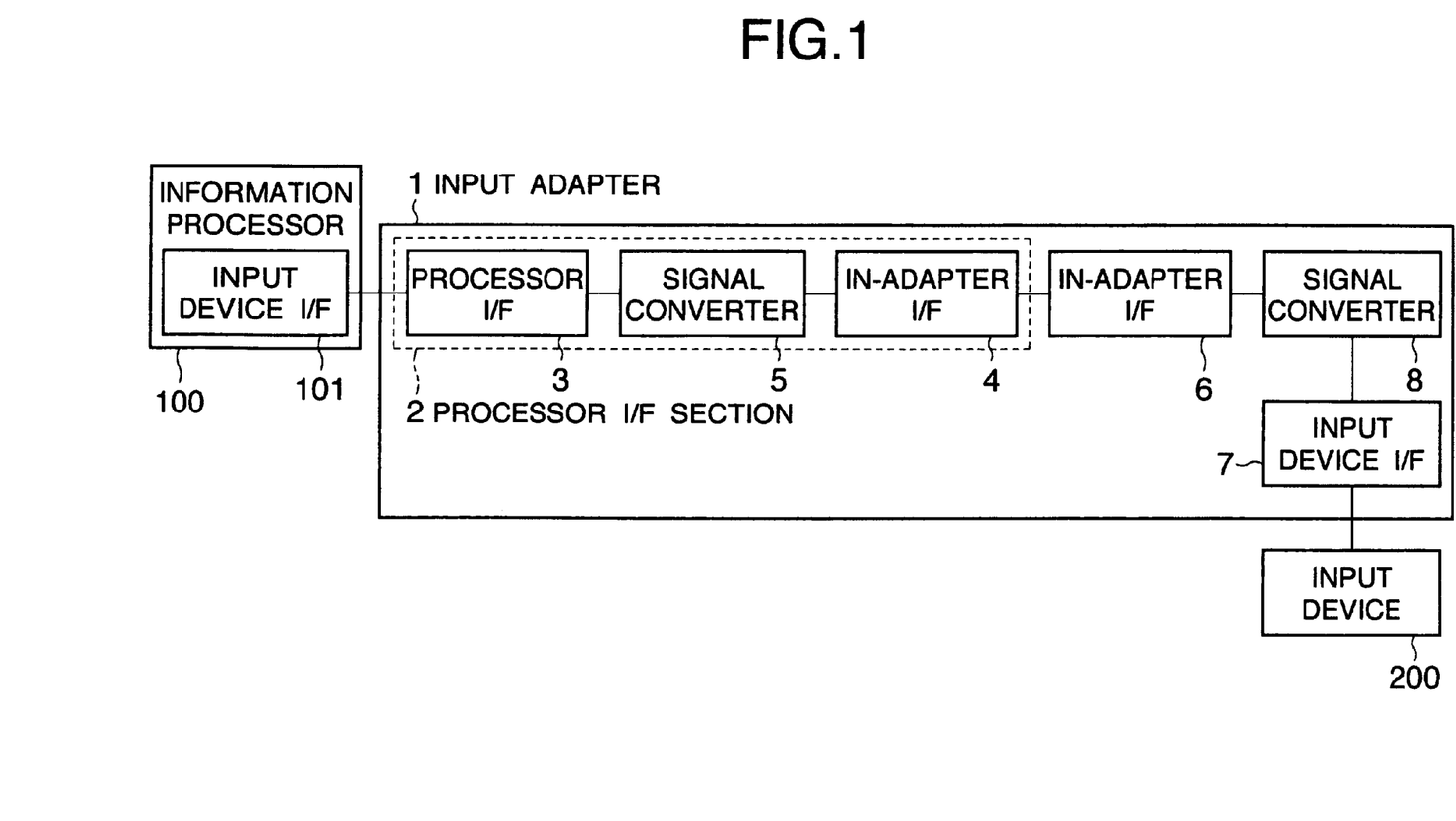
FIG. 1 is a block diagram illustrating the basic structure of an information processor, an input device, and an input adapter for which the present invention is suitable.

In FIG. 1 is shown the basic structure of the present invention. An information processor 100 is a personal computer or a word processor, and incorporates an input device I/F 101 for connecting an input device 200.

The input device 200 is a keyboard, a mouse or a tablet, and the input device I/F 101 of the information processor 100 is designed with the premise that it will be connected to the input device 200 that is suitable for a specific interface system. Normally, the input device I/F 101 has a connector for connecting a specific input device 200, and the input device 200 also has a corresponding connector for connecting the input device I/F 101.

In the present invention, an input adapter 1 is employed to connect the information processor 100 to the input device 200, the two of which are mutually incompatible.

The input adapter 1 comprises a processor I/F section 2 (a processor I/F 3, an in-adapter I/F 4, and a signal converter 5), which has an I/F that is adapted to the input I/F 101; and an input device I/F section 7 (an in-adapter I/F 6, an input device I/F 7, and a signal converter 8), which is adapted to an I/F of the interface of the input device 200.

Inside the input adapter 1, data input/output is performed by the in-adapter I/Fs 4 and 6, and the data are converted into an internal I/F form for the input adapter 1 by the signal converters 5 and 8.

More specifically, the signal converter 5 converts a signal received from the in-adapter I/F 4 into a processor I/F signal.

The signal converter 8 converts a signal received from the input device I/F 7 into an in-adapter I/F signal, and transmits it to the in-adapter I/F 6. When an input device that requires data input/output in the opposite direction is employed, the signal converters 5 and 8 are so designed that they can perform data input/output in the reverse direction.

The processor I/F section 2 and the input device I/F 7 are designed to be respectively connected to a specific information processor 100 (more specifically, its input device I/F 101) and an input device 200 (for example, the shape of a connector, the arrangement of pins, and a signal form are adjusted to conform to those of the other device).

Figure 2:
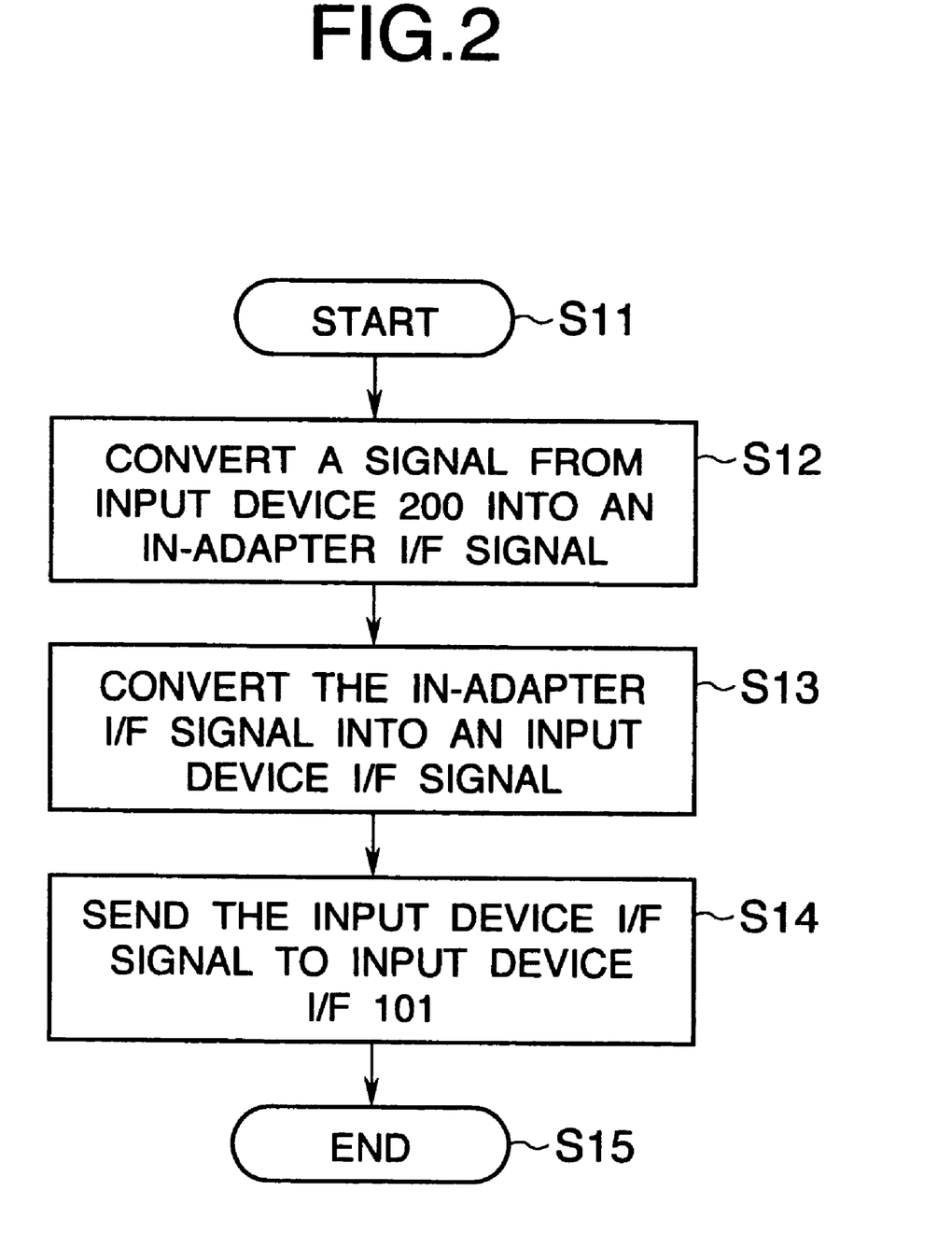
FIG. 2 is a flowchart for explaining the processing performed by the structure shown in FIG. 1.

FIG. 2 shows the processing for the transmission of an input signal from the input device 200 to the input device I/F 101 of the information processor 100. The processing begins at step S11 in FIG. 2 when data are entered at the input device 200.

At step S12, the signal converter 8 converts a signal received from the input device 200 into an in-adapter I/F signal. The resultant signal is transmitted to the in-adapter I/Fs 4 and 6, and also to the signal converter 5. At step S13, the signal converter 5 converts the received in-adapter I/F signal into a signal that is appropriate for the input device I/F 101 of the information processor 100. At step S14, the resultant signal is transmitted to the input device I/F 101 of the information processor 100. The processing is thereafter terminated at step S15.

According to the above described arrangement, the in-adapter I/Fs 4 and 6 are provided so that between the information processor 100 and the input device 200, an internal I/F system can be employed that does not depend on the input device I/F 101 of a specific information processor 100 and the interface of the input device 200, and so that the interfaces of the information processor 100 and of the input device 200 will match a predetermined model. Thus, an information processor 100 and an input device 200 that have different interfaces can be mutually connected.

Therefore, so long as an input device is already on hand, when a new information processor is to be purchased there is no need to purchase another input device only for that model, the input device on hand can also be used for the new information processor.

Figure 3:
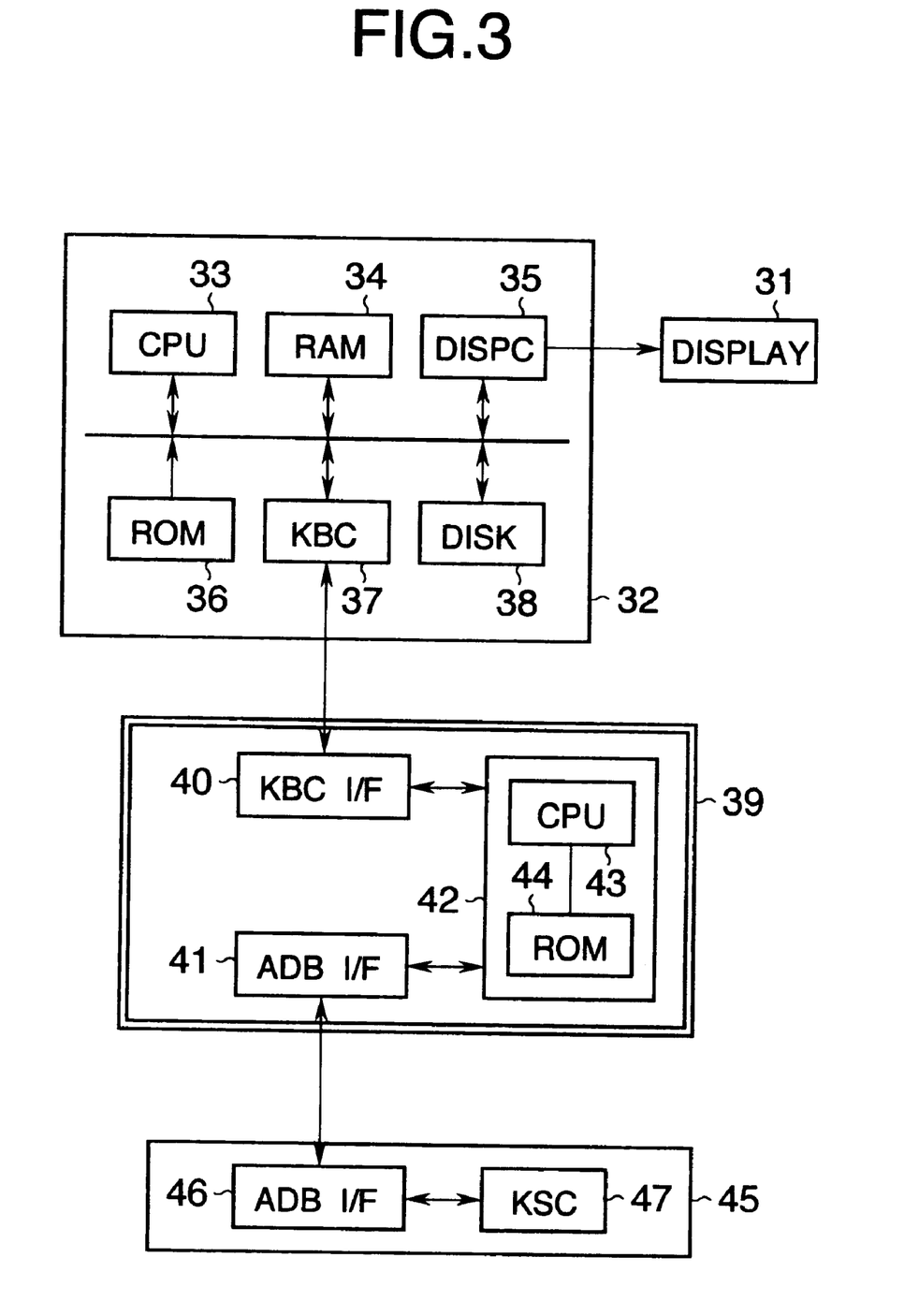
FIG. 3 is a diagram illustrating a system according to one embodiment of the present invention.

An example wherein an Apple (trademark) standard keyboard is to be connected to a personal computer other than an Apple computer, such as an IBM PC-AT compatible computer, will now be explained while referring to FIG. 3.

A keyboard 45 is an Apple standard keyboard, an information processor 32 is, for example, an IBM PC-AT compatible computer, and a display 31 displays information that is entered at an input device, such as a keyboard. An input adapter 39, which is the feature of the present invention, performs conversion of information that is entered at a non-compatible input device, so that the resultant information can be processed by the information processor 32.

The structures of the IBM PC-AT compatible computer 32 and of the Apple standard keyboard 45 will be briefly explained, and then the input adapter that is the feature of the present invention, and the required processing for it, will be described in detail.

A key scan controller 47 scans a key switch matrix that is arranged as a two-dimensional array in the keyboard 45, and detects changes in the switch states that are effected by key depression and release. An ADB I/F 46 is an Apple Desktop Bus interface. A CPU (Central Processing Unit) 33 executes various programs that are stored in a ROM (Read Only Memory) 36 or a RAM (Random Access Memory) 34. The RAM 34 serves as a storage area for various programs and as a work area. A display controller (DISPC) 35 controls a display 31. The ROM 36 serves as a storage area for various programs. A keyboard controller (KBC) 37 controls a keyboard that is connected to the information processor 32. An external memory 38 is a floppy disk, a hard disk, etc.

A KBC I/F is an electric interface with the information processor 32, and an ADB I/F 41 is an electric interface with the keyboard 45. A signal converter 42 converts into an IBM key scan code a scan code that is transmitted through the ADB I/F 46 from the Apple keyboard 45. This conversion is performed by a CPU (Central Processing Unit) 43 while referring to a conversion table that is stored in a ROM (Read Only Memory) 44 in a one-chip microcomputer. The ROM 44 is employed for storing the program shown in FIG. 2 or a key scan code conversion table. The CPU 43 executes the program that is described by the flowchart shown in FIG. 2 and that is stored in the ROM.

The operation of the input adapter will now be described while referring to FIG. 3.

A key signal that is entered at the Apple keyboard 45 is scanned by the key scan controller 47 in the keyboard 45, and is transmitted through the ADB I/F 46 to the input adapter 39.

The signal that is received from the Apple keyboard 45 by the ADB I/F 41 in the input-adapter 39 is transmitted to the signal converter 42.

The signal converter 42 converts the code for a signal received by the CPU 43 into an IBM key scan code by referring to the incorporated key scan code conversion table in the ROM 44, and sends the IBM key scan code to the KBC I/F 40.

The KBC I/F 40, which communicates with the KBC 37 in the information processor 32, forwards the key scan code. The KBC I/F 40 is compatible with an IBM keyboard.

The KBC 37 converts the received key scan code into a system scan code, and requests that the CPU 33 issue a keyboard interrupt to send the CPU 33 the system scan code.

Upon the receipt of the interruption request, the CPU 33 of the information processor 32 performs a keyboard interrupt process.

Through the above described process, an information processor and an input device that have different interfaces can be mutually connected.

In FIG. 1, the information processor I/F 3, the in-adapter I/F 4, and the signal converter 5 are enclosed by broken lines, and the block is denoted as the processor I/F section 2. The processor I/F section 2 may be designed as an independent plug-in module, not a part of the input adapter 1, and be replaced.

More specifically, with the structure wherein the processor I/F section 2 that matches each information processor 100 can be removed from the input adapter 1 and replaced, a specific input device 200 can be connected to an information processor 100 having a different input device interface by changing the processor I/F section 2.

Suppose that a certain input device is on hand and a new information processor having a different input device interface is to be purchased. Only a processor I/F section that matches the input device interface of the information processor need be prepared. By replacing the processor I/F section 2, the same input adapter can be used as that which is used for the possessed input device to connect the new information processor; there is no need to purchase both an input adapter and an input adapter.

Figure 4:
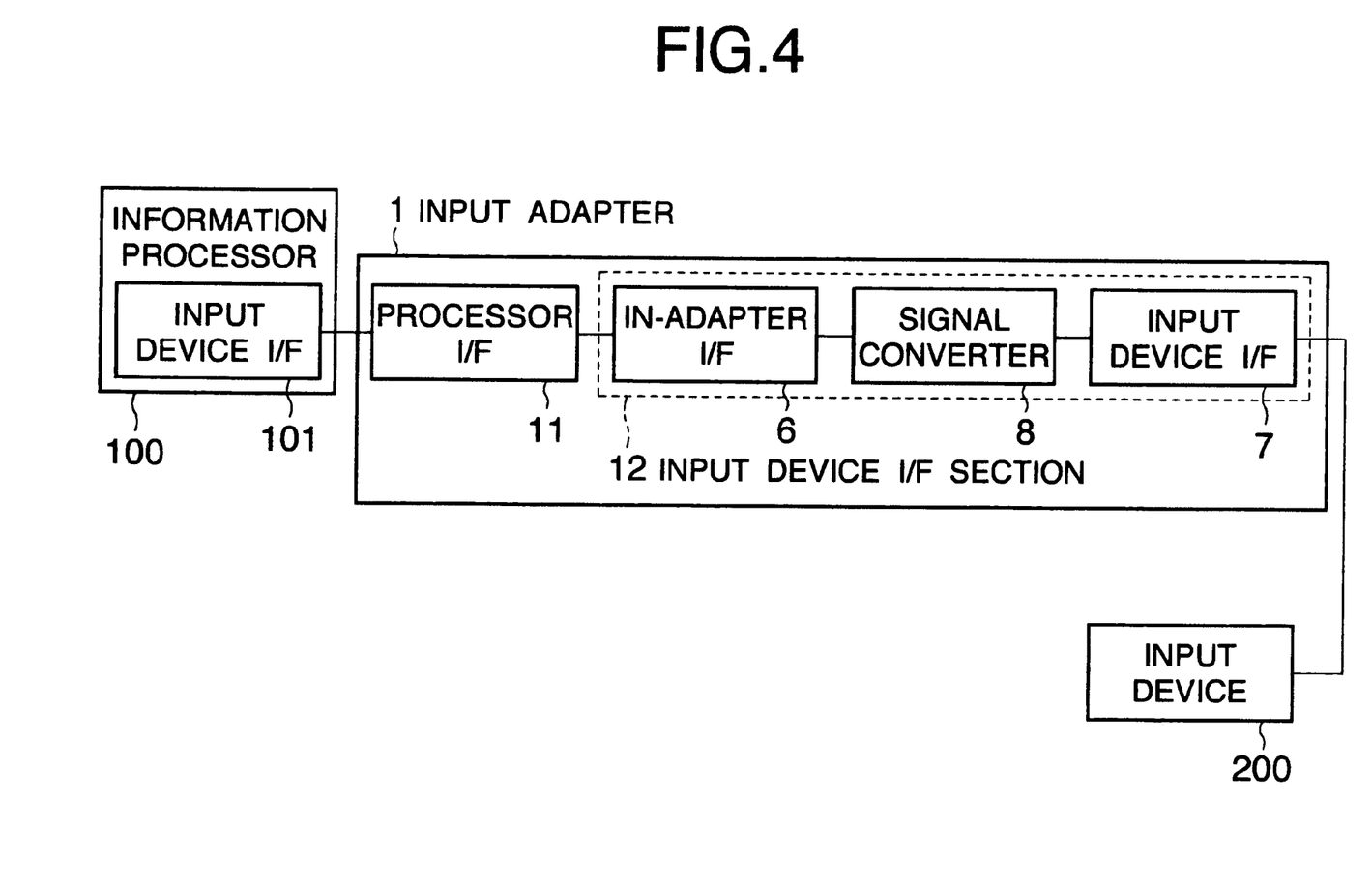
FIG. 4 is a block diagram illustrating an example arrangement in which an input device interface section in FIG. 1 is replaceable.

On the other hand, there is another idea that provides for an input device I/F section 12, which includes an in-adapter I/F 6, an input device I/F 7 and a signal converter 8, as is shown in FIG. 4, to be removed from an input adapter 1 and replaced. A processor I/F 11 in FIG. 4 corresponds to the processor I/F section 2 in FIG. 1, and is so provided with the assumption that it will not be removed and replaced. The other arrangement is the same as that in FIG. 1.

With the arrangement, as is shown in FIG. 4, wherein the input device I/F section 12 that matches the individual input device 200 can be removed from the input adapter 1 and replaced, a specific information processor 100 can be connected to an input device 200 having a different interface by changing the input device I/F section 12.

The processing for transmitting a signal from an input deice to an information processor in the structure in FIG. 4 is the same as that for the structure in FIG. 1.

Figure 5:
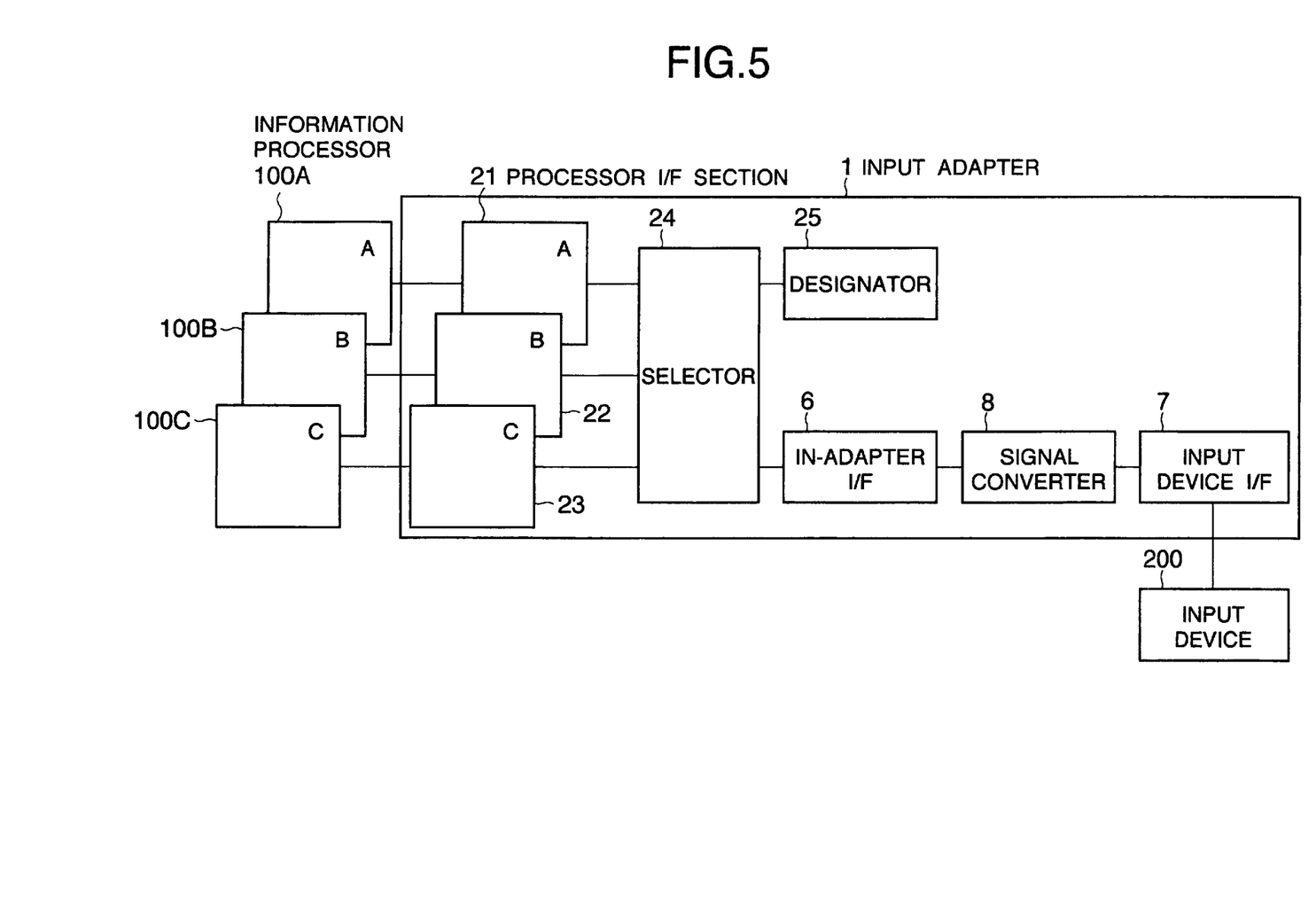
FIG. 5 is a block diagram illustrating the structure, wherein there are a plurality of processor interface sections, of the input adapter for which the present invention is suitable.

In FIG. 5 is shown another, different embodiment. Processor I/F sections 21, 22 and 23, each of which corresponds to the processor I/F section 2 in FIG. 1, are incorporated, and a selector 24 selects one of them for use.

The number of processor I/F sections is not limited to three, and more can be provided. The processor I/F sections 21 through 23 can be so designed that they can be replaced, as is the processor I/F section 2 in FIG. 1. In other words, a plurality of slots can be formed for the plug-in connection of the processor I/F sections 21 through 23.

The processor I/F sections 21 through 23, as well as the processor I/F section 2 in FIG. 1, are employed to connect specific information processors 100A through 100C, and each comprises a block that is the equivalent of the block that contains the processor I/F 3, the signal converter 5, and the in-adapter I/F 4. The signal converters 5, and the processor I/Fs 3 of the processor I/F sections 21 through 23 are designed to be connected to the corresponding information processors 100A through 100C.

The selector 24 is a circuit for selecting one of the incorporated processor I/F sections 21 through 23, and a designator 25 designates, for the selector 24, which processor a user is employing for data input.

A simple designator 25 can be constituted by employing switches, while a complex designator 25 can employ a command, such as one that is relayed by the depression of a keyboard key combination, for the designation process. The selector 24 transmits an input signal to that one of the processor I/F sections 21 through 23 that is designated by the designator 25.

The interface section for the input device 200 includes an in-adapter I/F 6, an input device I/F 7 and a signal converter 8, as is in FIG. 1.

Figure 6:
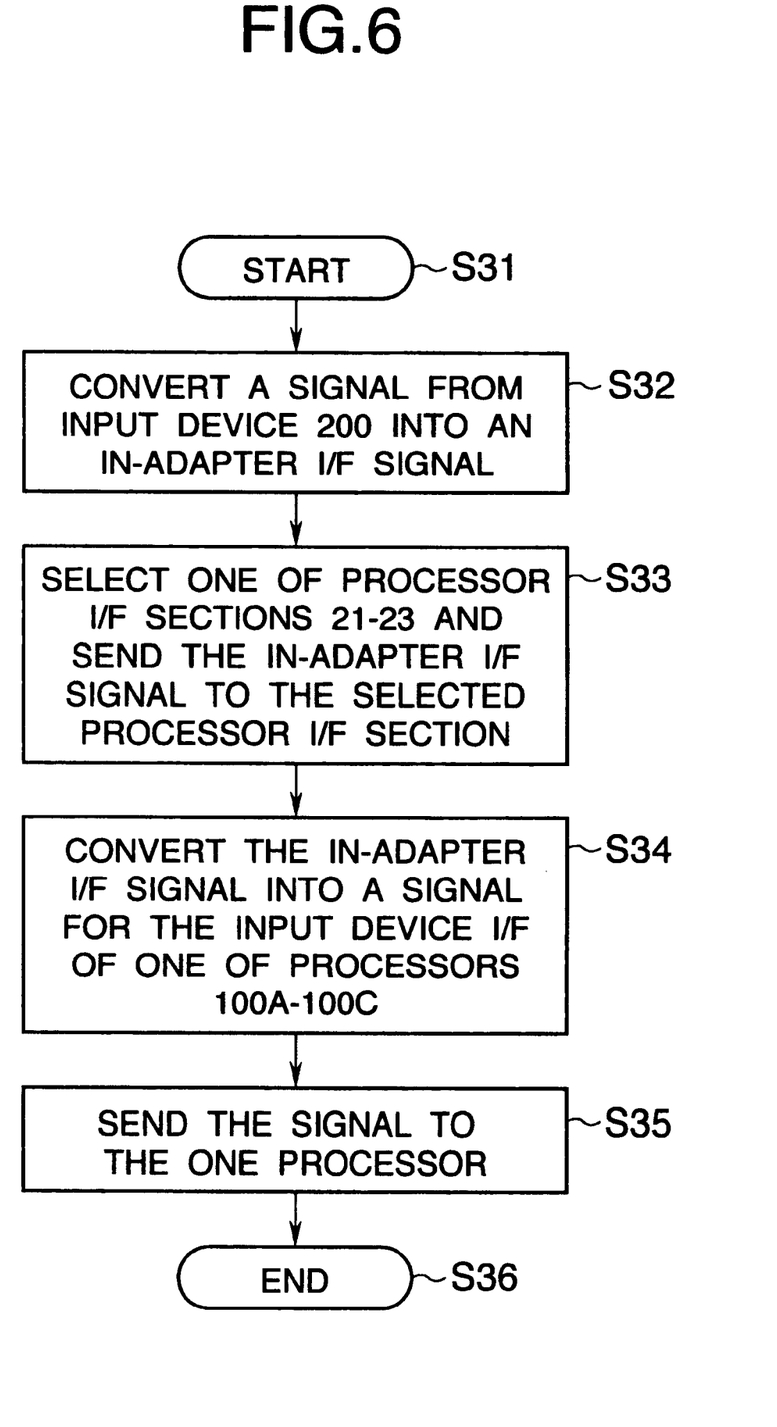
FIG. 6 is a flowchart for explaining the processing for the structure shown in FIG. 5.

The flowchart in FIG. 6 shows the processing for the transmission of an input signal from the input device 200 to one of the information processors 100A through 100C. When data is entered at the input device 200, the process is begun at step S31 in FIG. 6. At step S32, the signal from the input device 200 is converted into an in-adapter I/F signal by the signal converter 8.

At step S33, the selector 24 selects one of the processor I/F sections 21 through 23, in consonance with the designation made by the designator 25, and the input signal is transmitted to the selected processor I/F section.

At step S34, the selected processor I/F section converts the in-adapter I/F signal into a signal that is suitable for the input device I/F of one of the information processor 100A through 100C. At step S35, the input signal is sent to the corresponding information processor 101A to 100C. The process is thereafter terminated at step S36.

As is described above, with the arrangement wherein the processor I/F sections 21, 22 and 23, each of which corresponds to the processor I/F section 2 in FIG. 1, are so incorporated that the designator 25 and the selector 24 can select one of them, the selection of a processor I/F section enables the connection of a specific input device 200 to an information processor 100A to 100C that has a different input device interface. In this case, the replacement of the processor I/F section 2, as is performed while referring to FIG. 1, is not required.

In the arrangement in FIG. 5, especially when a plurality of information processors that are located close to each other are employed, an input device, such as a keyboard, a mouse or a tablet, can be used in common with these information processors. In addition, since the information processor that is to be used can easily be switched by the designator 25, work space can be effectively utilized.

Since the processor I/F sections 21 through 23 can be exchanged, more information processor models can use the input device 200, and a plurality of input devices that have the same, overlapping function are not employed, the efficiency of the utilization of device resources can be enhanced.

Figure 7:
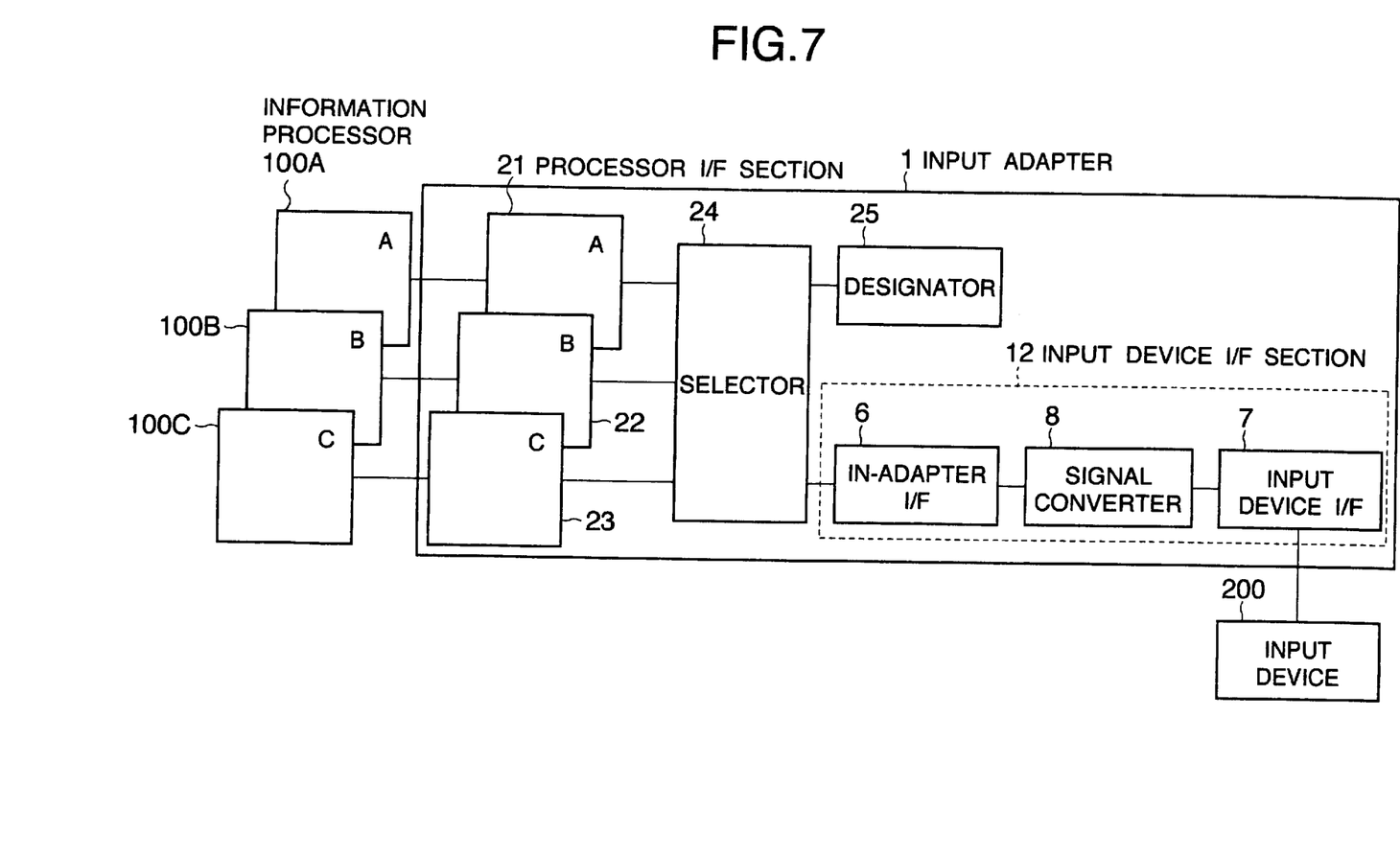
FIG. 7 is a block diagram illustrating an example arrangement in which an input device interface section in FIG. 5 is replaceable.

As is shown in FIG. 7, the arrangement in FIG. 5 can be so designed that the interface for the input device 200 is replaceable, as in FIG. 4.

In FIG. 7, an input device I/F section 12, which includes an in-adapter I/F 6, an input device I/F 7 and a signal converter 8, is designed as a module, and is replaceable as in FIG. 4. The other sections are the same as those in FIG. 5.

With the arrangement shown in FIG. 7, in addition to the effect obtained with the structure in FIG. 5, a desired input device 200 can be connected to an arbitrary information processor 100A to 100C by the exchange of the input device I/F section.

In other words, various types of input devices can be used with a single input adapter. One input device can be connected to a plurality of information processors, and data can be input to an information processor that is selected by the selection means.

As is apparent from the above description, according to the present invention, an input adapter, which has means for converting an interface signal between an information processor and an input device into an internal form and for transmitting data from the input device to the information processor, is provided so that information which is entered by an input device can be transmitted to an information processor that has a different interface. An information processor and an input device that have different interfaces can be mutually connected by employing an internal interface type, and there is no need to depend on specific types of interfaces. As a result, the compatibility between the information processor and the input device is improved, and an information processor and an input device that have different interfaces can be mutually employed.

What is claimed is:

1. An information adapter comprising:
   a plurality of interface means for connecting respective information processing apparatuses to said adapter, wherein said plurality of interface means have respective interface systems that differ in characteristics from each other;
   selection means for selecting any one of the information processing apparatuses connected by said plurality of interface means; and conversion means for converting information input by input means into information that can be processed by the one information processing apparatus selected by said selection means, wherein the conversion depends on which information processing apparatus is selected.

2. An adapter according to claim 1, wherein each of said plurality of interface means is replaceable.

3. An information processing system comprising:

input means for inputting information;

a plurality of information processing apparatuses for processing the information input by said input means;

a plurality of interface means for connecting said respective information processing apparatuses to said input means, wherein said plurality of interface means have respective interface systems that differ in characteristics from each other;

selection means for selecting any one of said plurality of information processing apparatuses connected by said plurality of interface means; and conversion means for converting the information input by said input means into information that can be processed by said one information processing apparatus selected by said selection means, wherein the conversion depends on which information processing apparatus is selected.

4. A system according to claim 3, wherein each of said plurality of interface means is replaceable.

5. A system according to claim 3, wherein said input means comprises a keyboard.

6. A system according to claim 3, wherein said input means comprises a mouse.

* * * * *

UNITED STATES PATENT AND TRADEMARK OFFICE
CERTIFICATE OF CORRECTION

PATENT NO. : 6,035,363

DATED : March 7, 2000

INVENTOR(S): SHIGERU FUJITA

It is certified that error appears in the above-identified patent and that said Letters Patent is hereby corrected as shown below:

COLUMN 1:
Line 31, "can not" should read --cannot--.

COLUMN 4:
Line 66, delete "both an"; and
Line 67, "input adapter and an input adapter." should read --two input adapters.--.

COLUMN 5:
Line 16, "deice" should read --device--; and
Line 66, "processor" should read --processors--.

Signed and Sealed this

Twentieth Day of March, 2001

Attest:

NICHOLAS P. GODICI

*Attesting Officer*   *Acting Director of the United States Patent and Trademark Office*